US009191403B2

(12) United States Patent
Zoldi et al.

(10) Patent No.: US 9,191,403 B2
(45) Date of Patent: Nov. 17, 2015

(54) CYBER SECURITY ADAPTIVE ANALYTICS THREAT MONITORING SYSTEM AND METHOD (71) Applicant: FAIR ISAAC CORPORATION, San Jose, CA (US)

(72) Inventors: Scott Zoldi, San Diego, CA (US); Jehangir Athwal, San Diego, CA (US); Hua Li, San Diego, CA (US); Matthew Kennel, San Diego, CA (US); Xinwei Xue, San Diego, CA (US)

(73) Assignee: FAIR ISAAC CORPORATION, San Jose, CA (US)

( * ) Notice: Subject to any disclaimer, the term of this patent is extended or adjusted under 35 U.S.C. 154(b) by 0 days.

(21) Appl. No.: 14/149,598

(22) Filed: Jan. 7, 2014

(65) Prior Publication Data
US 2015/0195299 A1 Jul. 9, 2015

(51) Int. Cl.
G06F 11/00 (2006.01)
H04L 29/06 (2006.01)
H04L 29/08 (2006.01)

(52) U.S. Cl.
CPC ........ H04L 63/1433 (2013.01); H04L 63/1408 (2013.01); H04L 67/30 (2013.01)

(58) Field of Classification Search
CPC ............ H04L 63/1416; H04L 63/1425; H04L 63/1433; H04L 63/1411; H04L 63/145; G06F 21/577
USPC ................ 726/22–26; 713/189; 709/223–225
See application file for complete search history.

(56) References Cited

U.S. PATENT DOCUMENTS

| | | | |
|---|---|---|---|
| 6,907,525 B2 * | 6/2005 | Pazi et al. | 713/170 |
| 6,981,279 B1 * | 12/2005 | Arnold et al. | 726/22 |
| 7,602,731 B2 * | 10/2009 | Jain | 370/252 |
| 7,725,934 B2 * | 5/2010 | Kumar et al. | 726/22 |
| 8,027,439 B2 | 9/2011 | Zoldi et al. | |
| 8,555,388 B1 | 10/2013 | Wang et al. | |
| 8,943,586 B2 * | 1/2015 | Kim | 726/22 |
| 2005/0054326 A1 | 3/2005 | Rogers | |
| 2009/0222243 A1 | 9/2009 | Zoldi et al. | |
| 2011/0320816 A1 | 12/2011 | Yao et al. | |
| 2013/0081129 A1 | 3/2013 | Niemela | |
| 2013/0097699 A1 | 4/2013 | Balupari et al. | |
| 2013/0204755 A1 | 8/2013 | Zoldi et al. | |
| 2013/0312097 A1 | 11/2013 | Turnbull | |
| 2013/0347114 A1 | 12/2013 | Altman et al. | |

* cited by examiner

Primary Examiner — Hosuk Song
(74) Attorney, Agent, or Firm — Mintz Levin Cohn Ferris Glovsky and Popeo, P.C.

(57) ABSTRACT

A system and method of detecting command and control behavior of malware on a client computer is disclosed. One or more DNS messages are monitored from one or more client computers to a DNS server to determine a risk that one or more client computers is communicating with a botnet. Real-time entity profiles are generated for at least one of each of the one or more client computers, DNS domain query names, resolved IP addresses of query domain names, client computer-query domain name pairs, pairs of query domain name and corresponding resolved IP address, or query domain name-IP address cliques based on each of the one or more DNS messages. Using the real-time entity profiles, a risk that any of the one or more client computers is infected by malware that utilizes DNS messages for command and control or illegitimate data transmission purposes is determined. One or more scores are generated representing probabilities that one or more client computers is infected by malware.

12 Claims, 10 Drawing Sheets

CYBER SECURITY ADAPTIVE ANALYTICS THREAT MONITORING SYSTEM AND METHOD

TECHNICAL FIELD

The subject matter described herein relates to computer network security, and more particularly to a system and method for cyber security adaptive analytics threat monitoring.

BACKGROUND

The malicious threats accessible via the Internet cannot be completely blocked by network administrators without severely curtailing a user's access to the Internet for legitimate purposes. In any large organization, it is inevitable that a user of an internal computer will install malware and compromise the security of the computer with malware which may, on its own, subsequently infect other computers of the organization's computer network. Some malware tries to extract valuable information from the compromised computer, and also, through the use of a botnet (a collection of "zombie" computers under control by malicious attackers), leverage the compromised computer to enhance the distributed botnet infrastructure associated with the malware. A botnet is an amalgamation of infected computers that differ in purpose and geographical location and as such the infected hosts have a variety of times when they are available to be contacted by malware.

To achieve this, the malware must communicate with the threat's instigator and signal that the computer has been compromised. The malware sets up a Command and Control channel (C&C) from the compromised internal computer to an external network infrastructure operated by the perpetrators. Once a line of communication is set up, the malware can hand over control of the computer to an unauthorized perpetrator, send valuable information accessible by the compromised host, or in turn become part of the network of compromised computers and facilitate the communication with other infected hosts.

As the malware and its delivery mechanisms change, it is necessary to consider networks as already compromised and invest resources into detecting where on the network the malware is located and the malware's communication destination. Once the C&C channel between compromised internal computer and external suspicious hosts is identified, the outbound communication can be cut, thereby protecting sensitive information and preventing the botnet from gaining additional resources. Details of any discovered C&C information can also be reported by responsible network administrators to security organizations so that other networks can pre-empt the same threat.

Figure 1:
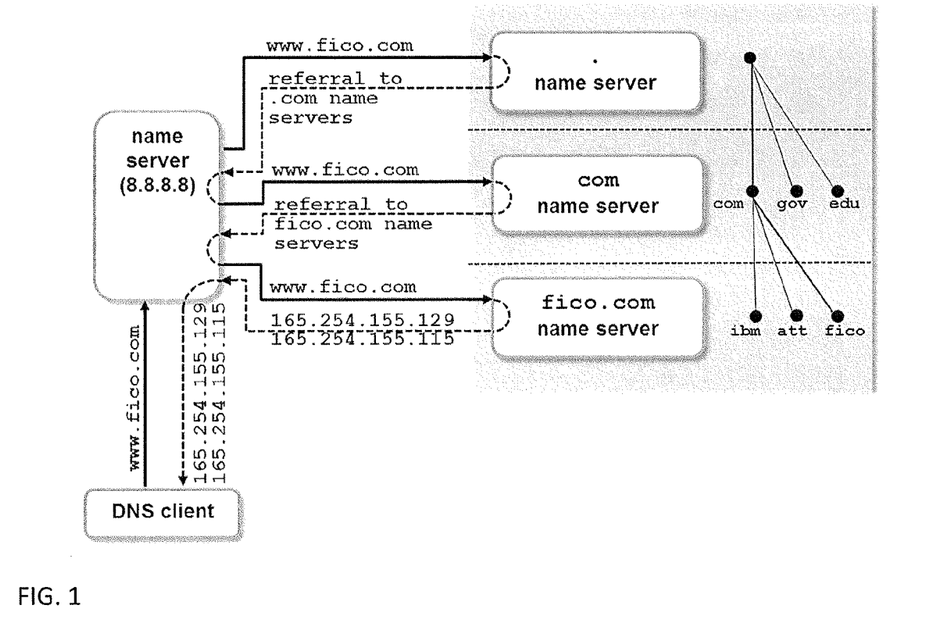
FIG. 1 shows an example domain name system (DNS)

Although malware technology continually evolves in its attempts to avoid detection and being blocked, the malware still needs to find a way to communicate to the outside world to perform tasks for its controllers. A common initial step in the detection process is to perform Domain Name System (DNS) queries on static or dynamically generated domain names associated with a botnet. To identify the C&C channel, DNS messages are focused on to determine which Internet Protocol (IP) addresses and domain names pose the greatest risk of being under malware control. FIG. 1 shows an example dynamic DNS.

Malware uses DNS messages for several reasons: it is a universally used protocol and so malware C&C usage is hidden within a large volume of legitimate DNS queries; DNS is distributed and publically accessible which provides an easy and robust method for local malware to contact its external C&C servers; the DNS port is often open in firewalls, allowing compromised computers to become name servers under malware control in order to enhance the strength of the botnet; and DNS resource records can be added and updated frequently allowing the malware to find botnet servers while making detection and tracking by network security staff more difficult.

Even though botnets continue to evolve overtime to evade detection and countermeasures, malware can still function under many older C&C paradigms and so it is important for a comprehensive real-time solution to detect modern, older and unknown schemes in addition to new unknown evolving methods.

SUMMARY

In one aspect, a method of detecting command and control behavior of malware on a client computer is disclosed. The method includes the steps of monitoring one or more domain name system (DNS) messages from one or more client computers to a DNS server to determine a risk that one or more client computers is communicating with a botnet, where each of the one or more client computers has an IP address. The method further includes generating a real-time entity profiles for at least one of each of the one or more client computers, DNS domain query names, resolved IP addresses of query domain names, client computer-query domain name pairs, pairs of query domain name and corresponding resolved IP address, or query domain name-IP address cliques based on each of the one or more DNS messages.

In another aspect, the method further includes determining, using the real-time entity profiles, a risk that any of the one or more client computers is infected by malware that utilizes DNS messages for command and control or illegitimate data transmission purposes. The method further includes generating, using real-time calibration profiles to determine the risk, one or more scores representing probabilities that one or more client computers is infected by malware.

In another aspect, one or more entity profiles is self-calibrated. Self-calibration scales one or more profile values based on peer group distributions of DNS messages from the one or more client computers. The real-time scores can be generated using self-calibrated profiling technology applied to scores.

In another aspect, a method described above further includes aggregating the monitoring from two or more monitoring systems to generate aggregated entity profiles, and generating aggregated scores based on the aggregated entity profiles.

The entity profiles can contain variables that calculate the empirical variance or entropy of the intervals between successive DNS query messages. In some aspects, a "white list" can be dynamically determined by dynamically keeping track of the most frequently queried domain names (fully qualified or different levels), or "cliques" across a consortium network, as further described herein. Queried domain name profiles and/or client computer profiles can contain variables that measure the DNS response message error rates, which can be monitored by a system or according to a method described herein. Alternatively, or additionally, entity profiles containing variables that measure the similarity between DNS query domain names can be used. The similarity metrics include but are not restricted to Levenshtein and Jaccard distances.

In yet another aspect, fluxes of keys such as IP addresses, query domain names, ASN, and country of IP addresses can be determined by tracking how often new keys appear in the lists of the most frequently observed keys or key tuples for the underlying profiled entity. Entity profiles can be used containing variables using similar techniques for analyzing IP addresses with other Internet traffic such as email and downloads.

In some aspects, external inputs can be used. For instance, in a method as described above, certain subsets of data used to form entity profiles are associated with or influenced by externally determined risk quantifications, whether corresponding to known or suspected malicious entities (blacklist), or, known or suspected legitimate entities (whitelist). Risk quantification may be binary or continuous. In some aspects, the externally determined risk quantification influences the computation of the entity profiles or risk scores. In some aspects, ground-truth feedback determined from users or administrators of the monitored systems comprises some or all of the externally determined risk quantification.

In some aspects, belief propagation techniques can be employed. For instance, in a method as described above, quantities related to riskiness of entities are propagated using graph-theoretical algorithms across a directed or undirected graph of one or more profiled entities which are connected to one another by electronic communications. Examples of profiled entities forming the nodes of the graph comprise without limitation: IP addresses of source or destination of messages, queried domain names or portions thereof, IP addresses of returned DNS query, and autonomous system number (ASN) or country associated with an IP address. Examples of electronic communications forming the edges of the graph include without limitation: UDP packets such as DNS queries or responses, TCP/IP connections, local area network packets and wide-area telecom network connections. The propagated quantities are used to improve performance of one or more risk scores associated with one or more client computers being monitored, or to improve utility of entity profiles used to inform such risk scores. In an aspect, the graph-theoretical algorithm is a Bayesian belief propagation.

Certain subsets of entities comprising either nodes or edges on the graph are associated with or influenced by externally determined risk quantifications, whether corresponding to known or suspected malicious entities (blacklist), or, known or suspected legitimate entities (whitelist). The propagation of riskiness across nodes may be influenced by or weighted by computations arising from values determined by entity profiles at each node, properties of each node, or properties of the communication forming the edge. In some aspects, the propagated quantity is a risk score.

In some aspects, a method includes aggregating entity profiles, in which one or more of the transaction histories, entity profiles or risk scores are aggregated across multiple monitoring systems in a consortium view to determine additional quantities, and which are communicated back to the individual monitoring systems to increase the usefulness of their entity profiles, their risk scores, or become additional elements used in the computation of risk scores for the monitored systems. The additional quantities being computed influence the weighting of individual risk elements for determining one or more risk scores, and/or influence the calibration of entity profiles or risk scores, and/or improve the usefulness of the Internet clique computations. In some aspects, the additional quantities being computed result from an extended graph determined from the aggregated consortium view of the data, and/or are determined from aggregates of ground-truth C&C feedback across multiple monitoring systems, and/or are updated in real-time or batch at one or more centralized computational assets associated with the consortium. In yet other aspects, the additional quantities being computed are refreshed so that more recently occurring events or more recently updated profiles have greater influence than events or profiles from more historically distant periods. The additional quantities may be determined over multiple time scales which quantify the period or rate for lowering the influence of past information.

The methods and systems described herein can be implemented inside a consortium member's firewall or hosted at another site (i.e., in the cloud).

Implementations of the current subject matter can include, but are not limited to, methods consistent with the descriptions provided herein, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide systems and methods to process streaming transactions by maintaining real-time entity profiles, which include real-time recursively updated variables, and to utilize real-time updated calibration profiles to scale individual variables as well as transform this multitude of attributes into a single score that reflects the probability of a C&C communication being malicious or associated with malware.

In implementations consistent with the subject matter described herein, a Cyber Security Adaptive Analytics Threat Monitoring (CAATM) System (the "monitoring system") is provided. Transactions used to build profiles and scoring models may or may not contain labels distinguishing the transactions from good or bad sources. In the case of unlabeled data, the generated score represents a probability that the transaction occurred given the transactions for that entity, as well as the transactional traffic of all entities. In this scenario, transactions with low probabilities are considered rare and suspicious. For labeled (e.g., malicious or benign behavior) data, the generated score represents a probability of the transaction belonging to a category. Labeled data can be fed back into the monitoring system to update model weights. In one implementation, real-time DNS messages are the unlabeled streaming transactions. However, data from other protocols (email, downloads, etc.) could be processed separately or in conjunction with DNS messages to build profiles and self-calibrating models. Also, batch (non-streaming) data can easily be converted for use in the monitoring system as streaming data by reading batch data from files or database tables periodically and sending them on to the monitoring system.

A single comprehensive score is much simpler for end users to manage and build rules around rather than trying to manually manage interactions of multiple scores and manually determine their relationship to malicious C&C activity. As such, network administrators can have a set of cases ranked by their scores, allowing the administrators to more efficiently focus resources on the most suspicious entities and prevent data loss as well as the growth of the botnets.

The monitoring system can employ a number of modeling and profiling technologies, including entity transaction Profiles, Behavior Sorted Lists, Global Intelligent Profiles (GIP), Self-Calibrating Outlier models, Adaptive Analytics and Collaborative Profiles. These and other modeling and profiling technologies have been pioneered by Fair Isaac Corporation of San Jose, Calif., and are explained in further detail below. The monitoring system can also use other technologies, such as determining C&C beaconing second order moments and entropy metrics, belief networks, constructing bipartite graphs for clique identification, and proactive requests for additional data to enhance consortium risk of features to produce interesting bases for real-time self-calibrating outlier analysis. The features discussed below can be used to detect C&C activity, and many features can be combined into a single score to improve detection and reduce false positives.

Figure 2:
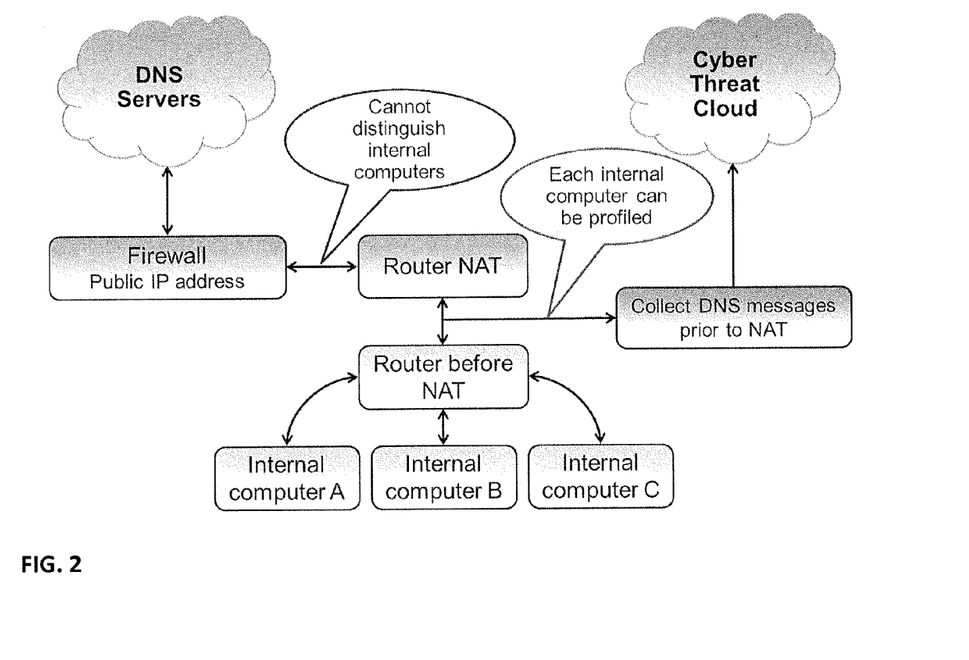
FIG. 2 is a system block diagram to illustrate optimal DNS message collection.

Profiling and GIP technology provide an efficient means to update real-time streaming C&C features without having to explicitly store historical DNS messages or rely on high latency databases. The streaming analytics approach is fundamental to be able to stop or limit the C&C activity quickly by detecting these activities in real-time. As shown in FIG. 2, profiling technology can be applied at many levels to quantify whether behavior of an individual entity is within the norms of the peer groups to which their activity is compared. The profiling levels include, but are not restricted to, the source IP within the DNS message that initiates the query (source IP), the combination source IP and the domain or host name the source is trying to have resolved (query name), the query name, the IP address of the resolved query name, and the set of IP addresses and query names that belong to one organization or group (internet clique). Collection of DNS messages prior to network address translation (NAT) allows for each computer internal to an organization to be profiled and monitored for changes in behavior. After NAT, the internal computer's IP address(es) are not available, in which case the malware signal may be more difficult to detect due to mixing of requests from one or more computers under the NAT.

The monitoring system can also be implemented exclusively in the cloud, i.e. maintaining profiles, updating variables, scoring, case management and other processing of data from the consortium and external sources can be done outside of a consortium member's computer network and firewall. The consortium (a group of organizations that send DNS messages to the monitoring system and use the resulting scores) stream anonymized DNS messages to the cloud-based monitoring system, which builds real-time profiles and provides scoring, provides case management capabilities and adaptive model updates based on labeled cases. When an internal computer behaves suspiciously, the monitoring system sends alerts to the network administrators within the appropriate organization. Cases are sets of DNS messages that are grouped by profile entity (e.g., source IP, internet clique, etc.). Administrators can interact with cases specific to their own organization via a case manager, and can label or designate which query names or resolved IP addresses are potentially part of a botnet and which query names are false positives (legitimate domains or host names that scored high because of behavior similar to botnet behavior).

The labeled and unlabeled data sets collected within the cloud-based monitoring system are periodically processed by a batch processing engine, such as Hadoop, for tasks that are not appropriate for streaming, and the monitoring system model parameters are updated. The consortium data in the cloud-based monitoring system presents a large-scale collective view, which improves model scoring so that suspicious query names score higher, and false positives are suppressed based on a variety of individual CAATM model installations. For instance, the most popular domains could be considered legitimate due to the persistently high and stable volumes of DNS traffic when viewed globally, which would not be a signature of malware. When viewed within one organization, the evidence of malicious behavior for some external IP addresses or query names may be weak or equivocal. However, the behavior may become more clearly distinguishable as malicious when the evidence is accumulated over a larger set of observations across multiple installations of the monitoring system. Although many organizations may contribute to the consortium and benefit from the resulting improvements in scoring, any given organization would not be able to see other organization's DNS messages explicitly, thereby securing privacy.

External data sources may be used to enhance scoring, decisions and batch processing analytics. Some external data sources may be reserved for the lower volume high scoring transactions to limit bandwidth or computational expenses. If a transaction scores high, additional information such as the "whois" protocol may be used to obtain registration information, telemetry data to determine resolved IP geographical location or proprietary information from external private vendors. External sources may also provide labels of botnets found independently of the monitoring system. Email monitoring, file downloads, and SMS may be used to supplement the monitoring system to further enhance the score, and/or alert to bots that have yet to activated or found C&C.

Figure 3:
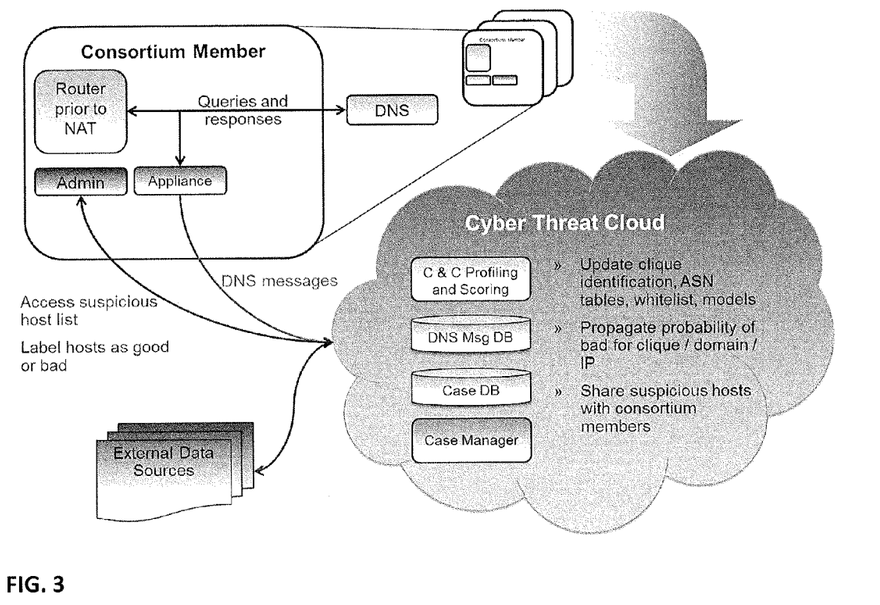
FIG. 3 illustrates a monitoring system consistent with implementations disclosed herein.

In some implementations, and as illustrated in FIG. 3, the monitoring system is implemented as cloud-based analytics (i.e., distributed computing and analytics conducted over a network such as the Internet, or a collection of networks), where aggregated consortium data is used to provide a holistic view across more than one CAATM model installations. The aggregate results of the analysis strengthen alerts/cases on certain domain names or resolved IP addresses. The cloud is an efficient way of aggregating information from disparate monitors.

Variations of the monitoring system include locating one or more of the monitoring components within the consortium member's network rather than in the cloud. For example, the profiling, scoring and case manager capabilities can be relocated to the member's network. The members can still contribute labeled cases and DNS messages to the cloud-based monitoring system and receive updates from the cloud in the form of alerts or parameters to update the models.

Figure 4:
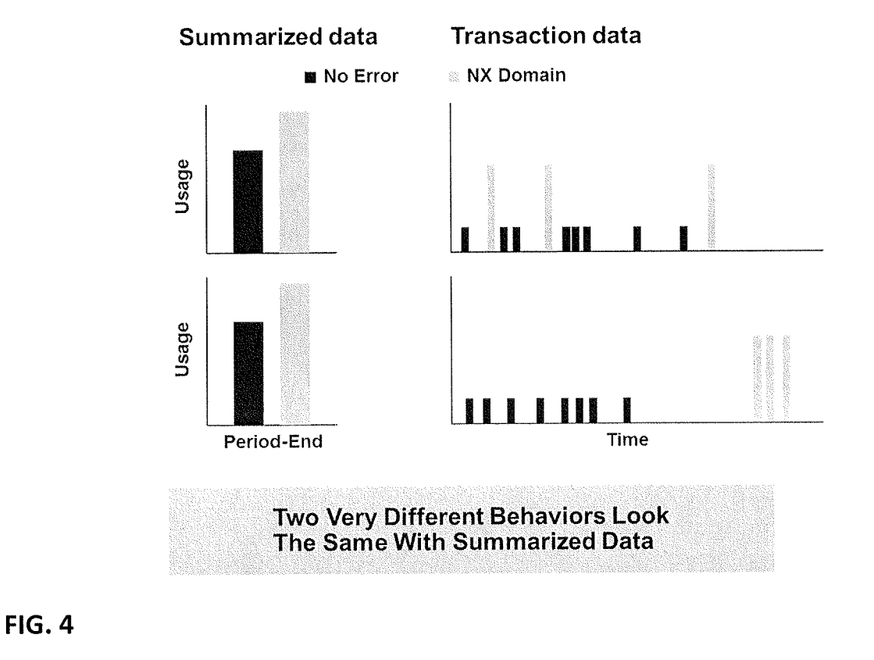
FIG. 4 illustrate transactional behaviors of normal and compromised computer systems.

By examining the internal computer prior to being infected with malware, deviations from a normal behavior, as defined by the internal computer, can be detected and ranked according to riskiness. For an internal computer that has already been compromised, its behavior can be compared to that defined by consortium profiles and profiles of previously infected computers. Methods for profiling entities include multiple queries of databases, or maintaining a history within the input message to determine if long term entity behavior differs from short term entity behavior. While these methods do not enable real-time detection of threats or low latency decisions, transaction profiling technology, on the other hand, does not require explicit storage of a transaction history, and instead utilizes recursive formulas to decay and adjust variable estimates smoothly over events or physical timescales. As an example:

$$pv_t = (1-\beta)pv_{t-1} + \alpha * f(x_t)$$

where
$pv_t$=current value of profile variable
$pv_{t-1}$=previous value of profile variable
$f(x_t)$=function of current input transaction
$\beta$=coefficient
$\alpha$=coefficient The above recursive variable example allows a current estimated value $pv_t$ to be based on the past estimate $pv_{t-1}$ and on a function of the current transaction being processed. Transaction profiles are computationally efficient and provide real-time predictive scores for low-latency decisions such as fraud decisions on credit card authorizations. Transaction profiles represent transaction behavioral features deemed most predictive. Profiled entities can be applied globally or on per-entity bases such as source IP, resolved IP address or query name. Using transaction profiles allows for updating profiles and scoring for every DNS message, which leads to greater insight into the entity's behavior and in a low latency time frame to enable disruption of malware C&C before loss of information occurs in a cyber-application, as shown in FIG. 4.

For example, a work computer may be on 24/7 but not used during nights or weekends. By profiling on DNS error responses over time, non-existent-domain (NXDOMAIN) errors would be unusual at night for the internal computer (since the computer is not used at that time), and therefore these variables would increase the overall monitoring system score.

Self-Calibrating Outlier Analytics

Figure 5:
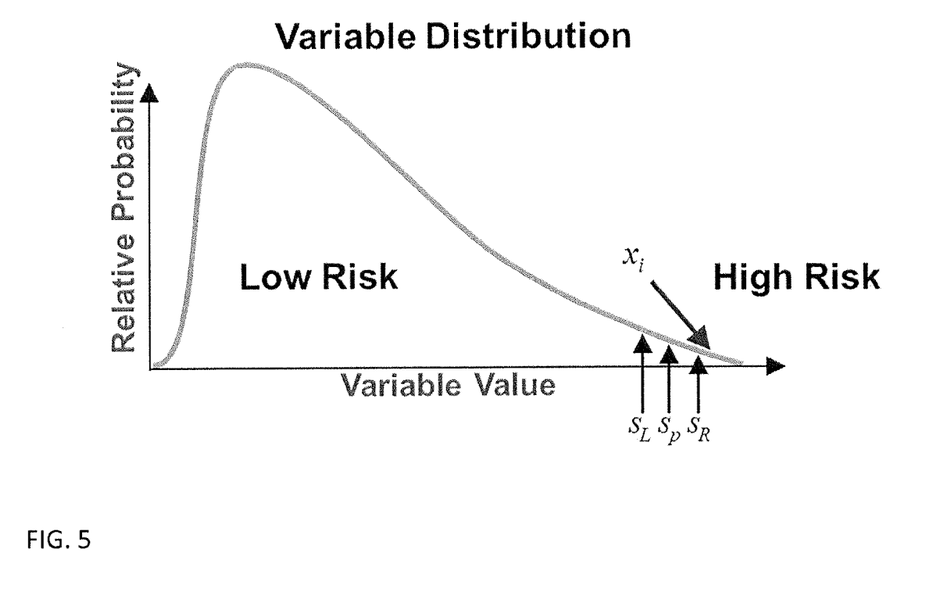
FIG. 5 shows a variable distribution in accordance with a risk analysis technique.

Unsupervised models are models built on data that does not have labels (i.e., transactions are not categorized as good or bad). In this situation, variables can be constructed such that observations in the right side of the variable's distribution are considered more risky. In order to automatically determine if an observation is an outlier, and have the definition of outlier adjust in real-time to fluctuations in a variable's finite time rolling distribution, Self-Calibrating Outlier Analytics has been introduced by FICO. As described in U.S. patent application Ser. No. 11/532,859, entitled Self-Calibrating Fraud Detection, the contents of which are incorporated by reference herein for all purposes, a sequential quantile estimation algorithm is used which requires only one pass of the input stream, uses constant memory and does not require any persistence of transaction values. The resulting outlier values have a common scaling for combining multiple variables into an outlier scale q, to form a single score, $\eta$, as shown in FIG. 5.

Self-Calibrating Outlier Analytics adjusts the three estimates $S_L$, $S_p$ and $S_R$ for each incoming observation X. The observation value is then centered and scaled according to $S_p$ and $(S_R-S_L)$, respectively. A more general and more computationally expensive approach is to determine observation values at all quantiles from $S_L$ to 1 to ensure the outlier features are better aligned prior to combining the features to produce a score.

Figure 6:
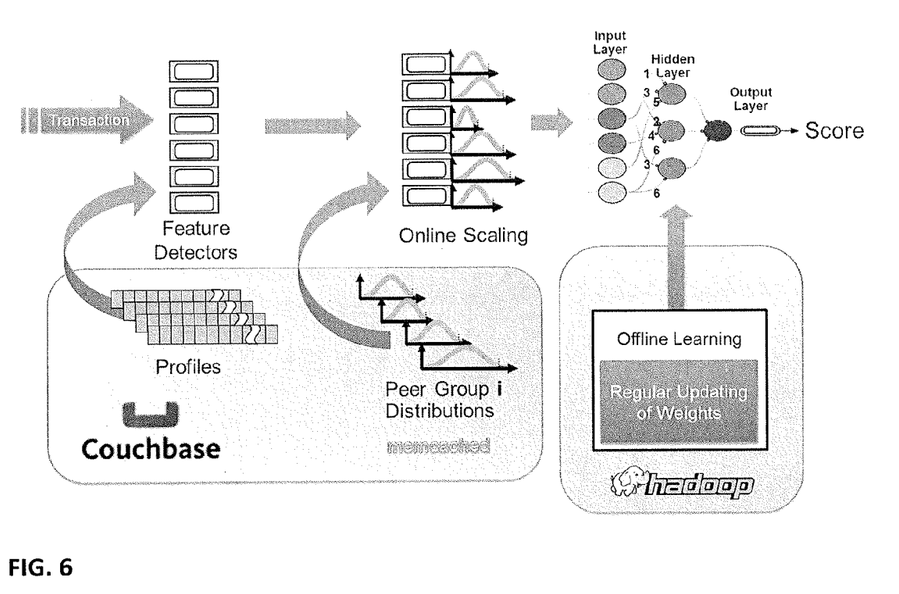
FIG. 6 illustrates a multi-layered self-calibrating analytics system and method.

In accordance with some implementations consistent with subject matter described herein, once a DNS message is processed, its transaction profile variable features are scaled by the self-calibrating analytics and combined to form a score that is proportional to the message's riskiness. Factor analysis can be applied to the self-calibrated features to reduce impact of dependent inputs as well as limiting the model's degrees of freedom. For unsupervised models, features can be combined using uniform or expertly selected weights. If some labels do exist, then supervised methods can be used to determine the weightings applied to the features to produce a score, as illustrated in FIG. 6.

The weights and resulting score can be further modified by adding offline learning. This adaptive component utilizes labels applied by administrators to DNS messages and propagates the information to the main model's weights or updates a separate model whose score can be combined with the main model. The offline learning can help the model adjust more quickly to new malware patterns or help to calibrate the model when the deployment environment differs significantly from that of the development. This offline learning approach is described in further detail in U.S. patent application Ser. No. 12/040,796, entitled "Adaptive Analytics," the contents of which are incorporated by reference herein for all purposes.

Modifications to the above system can include projecting features onto other bases to produce more interesting output features. For example, if the input features are numerous and some with significant dependence on each other, techniques such Principle Component Analysis as described in U.S. patent application Ser. No. 13/367,344, entitled "Multi-Layered Self-Calibrating Analytics" the contents of which are incorporated by reference herein for all purposes, to determine factor groups and reduce over-influence of any one feature. Other methods such as Independent Component Analysis (ICA) may be applied to reduce the dimensionality and generating output features that may be more interpretable.

Collaborative Filtering algorithms, such as those developed by FICO, provide a probabilistic framework for defining archetypes and assigning an entity's membership to each archetype based on the entity's DNS message history. Given the entity's archetype membership, FICO's proprietary variables measure the probability that a new DNS message was generated by that entity. If malware infected an internal computer and began to make DNS queries, it is likely that the malware's DNS message pattern did not fit the pattern of topic allocations of DNS history of the internal computer's normal behavior and those DNS messages would be given a low probability pointing to a higher risk of botnet.

Alternatively, if enough labeled data was present during model development, malware archetypes can be developed and DNS patterns matched against that behavior. One example is to create "words" in the document history by combining sequences of Autonomous System Numbers (ASNs) from the IP addresses in the DNS response messages. Bursts of DNS queries can be associated with legitimate activity such as visiting a website which hosts many ads or malicious activity mixed in normal activity. The ASNs of the visited website and the associated marketing service providers are commonly seen together and certain internal computers tend to go to these types of sites more often than others. Collaborative Filtering can be used to determine if an ASN combination is rare, given the internal computer's history, and identify that the malware query names do not fit in with the surrounding legitimate DNS queries.

Some compromised hosts may be a home computer that is on in the evening and on weekends, while others may be a work computer on during weekdays, and still others might belong to a web service provider and are on 24 hours a day, 7 days a week. Over time, many of the compromised hosts are removed from the bot network when they are cleansed of malware or have their IP addresses blocked. To compensate for unreliable uptimes, a botnet may perform a task called IP flux, in which many IP addresses are rotated for a single domain name to ensure newly infected computers are able to connect to the botnet. The low Time To Live (TTL) on Resource Records (RR) as well as constantly changing IP addresses are not only a characteristic for botnets, but also for legitimate Content Delivery Networks (CDNs) since both are trying to present a robust load balancing server infrastructure.

Figure 7:
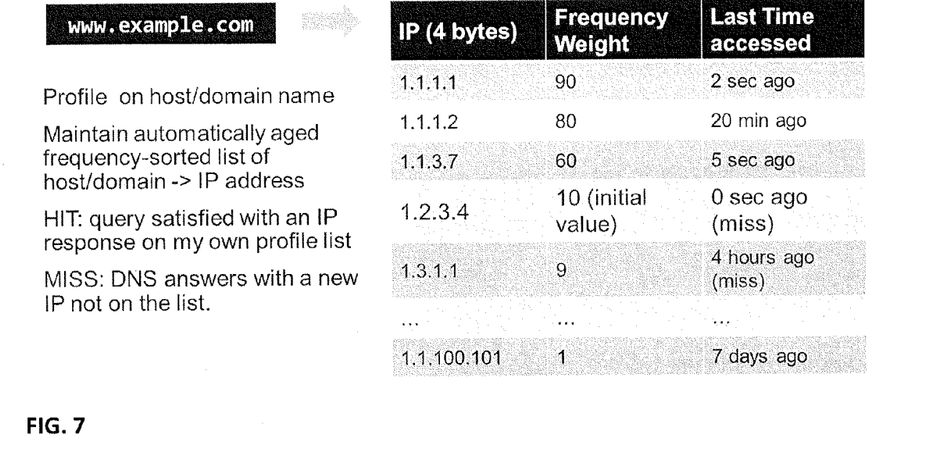
FIG. 7 shows a behavior sorted list example.

To identify IP Flux, a technique known as a Behavior Sorted List (BSL), such as that provided by FICO, can be used to store IP addresses associated with a domain name or Internet clique. As illustrated in FIG. 7, IP addresses that occur often are given a larger weight and stay on the list, whereas less frequently occurring IP addresses fall off the list to make room for new observations. Model variables take into account the number of IP address entries in the list as well as the rate at which new IP addresses enter the list. As mentioned above, legitimate CDNs can rotate through IPs for load balancing and high availability purposes.

To differentiate between the good and bad networks the number of entries and rates are normalized by the overall query volume associated with the domain name or Internet clique. As CDNs or other service providers increase in size, larger IP flux values are justified to handle the larger traffic volumes. However, the traffic associated with a botnet will not be congruous to the ratios seen in legitimate CDNs.

Normalized IP flux variables alone may lead to many false positives due to Web Service providers, such as Amazon Web Services, which have low TTL (~60 seconds) for domains and dynamically assign new IP addresses upon expiration of the resource record. This is why this is one of many variables used in the monitoring system score.

Domain Flux

An additional layer of complexity botnets can implement is domain fluxing, which is the generation of many domains at rates in the thousands per day. In domain fluxing, the botnet owner only registers a few domain names, and the malware sends multiple queries throughout the day until an answer is provided. Note that if the botnet owner is only registering a few of the domain names produced, the malware will incur a high rate of NXDOMAIN errors. Profiles that are assembled can be used to measure the rate of NXDOMAIN and compare that to the internal computer's long term NXDOMAIN rates as well as rates at other aggregated levels such as the subnet, organization or consortium. In addition to a higher error rate, the domain names will be exceedingly rare at any aggregated level and may show differences in name construction compared to valid domain names.

The query name itself can be examined to see whether the name appears normal or if its temporal neighbors have similar structure using Levenshtein and Jaccard distances, for example. These are text analytics methods that determine the distance, or number of characters apart, between two different strings such as "google.com" and "gooogle.com." For example, the Levenshtein distance would count the number of letters that need to change for the two domains to match. The Jaccard distance looks at shared substrings in the text strings, such as, for example 'goo' in both, '.com' in both, 'gle' in both, etc. Each of these substrings are called N-grams, the Jaccard technique uses these to find that these two are close by comparing the union on N-grams without counting the number of atomic changes to make them the same.

Also, associated with the domain flux is the "throw away" nature of the domain names. A domain name may be registered only hours prior to the malware trying to resolve it and then after a short time, such as 24 hours, the domain is never used again. Domains can be post processed and submitted to a pool of suspect names for further analysis.

Internet Graph Analytics: Clique Identification and Bayesian Belief Propagation

Legitimate providers of large-scale robust distributed internet services, such as Akamai, or Google, show significant "domain flux" and "IP flux" behavior in their normal operation, mimicking botnet behavior. Organizations often have many aliases due to mergers, for providing hosting services or to prevent URL typos from being used for malicious purposes. Bipartite graphs are constructed where nodes represent queried domain names and corresponding IP addresses (or ASNs). An edge indicates that a DNS query was initiated or DNS response was recorded connecting one node to another. To consolidate IP fluxing and domain aliases into a single entity, and potentially cluster common communication of compromised computers as being part of a botnet, we examine the "cliques" (connected components) of the graph. When clustered in this fashion the legitimacy or illegitimacy of a set of connected hosts and IP's become more apparent. For instance, a Google internet application such as Gmail might talk to a substantial set of associated IP addresses, but viewed globally they are all part of the "Google" or "Gmail" clique. Similarly, a botnet will show communication from a set of domain names generated randomly by the perpetrator to a set of compromised computers, and this set is clustered in the clique analysis.

Figure 8:
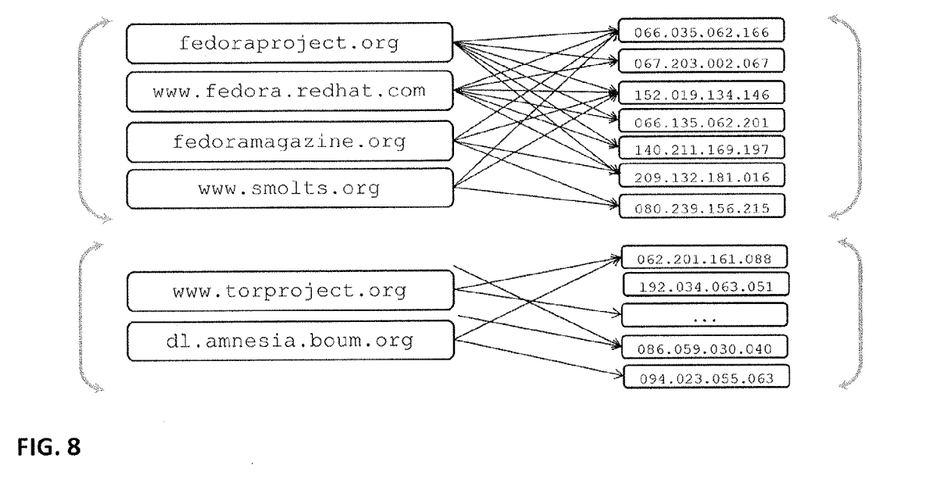
FIG. 8 illustrates an example of cliques clustering sets of domain names and IP addresses.

For an established clique, the addition of a new domain names could be risky and indicate that a botnet owner may have mapped a new domain name to the IP of a newly infected computer, which may happen more rapidly than legitimate Internet content providers. Cliques help to reduce the domain-IP complexity and allow for all nodes to contribute to the profile variables of a clique which can be used to score the riskiness of the domain names and IP addresses associated with it. Hosts for well-known legitimate content delivery networks often are "whitelisted" to reduced false positives, but these whitelists are never complete and cannot be updated sufficiently rapidly to account for the infrastructural and technological changes at every content provider. Most of the time many nodes will remain in the whitelist (for instance www-.google.com will never be dropped and is frequently queried), and their obvious legitimacy on the whitelist can be propagated to other more transient infrastructural domains and IP's operated by the content provider which are tightly bound in the same clique, as shown in FIG. 8.

In the clique technology described, nodes forming a binary relationship are either connected or not connected. An extension to this idea provides for a continuous-valued weight associated with each edge in order to propagate some measurement of risk from one node to another. In this scenario one set of nodes corresponds to the individual computers being monitored and the other set of nodes either the queried hostname or IP addresses returned by the queries. In distinction to a content delivery network (where all IP addresses and domains connected are legitimate) or a botnet (where all IP addresses and domains connected are malicious), in this case a compromised internal computer will make queries to both legitimate and malicious hosts. Frequently a small number of IP addresses and domains corresponding to a botnet may be positively identified, but because of aggressive domain and IP fluxing the botnet is continuously updating and moving. There are a multiple of methods to combine risky C&C from one or more installations of the monitor, one example being a Bayesian Belief Propagation algorithm on a bipartite host computer to domain (or IP) graph.

Figure 9:
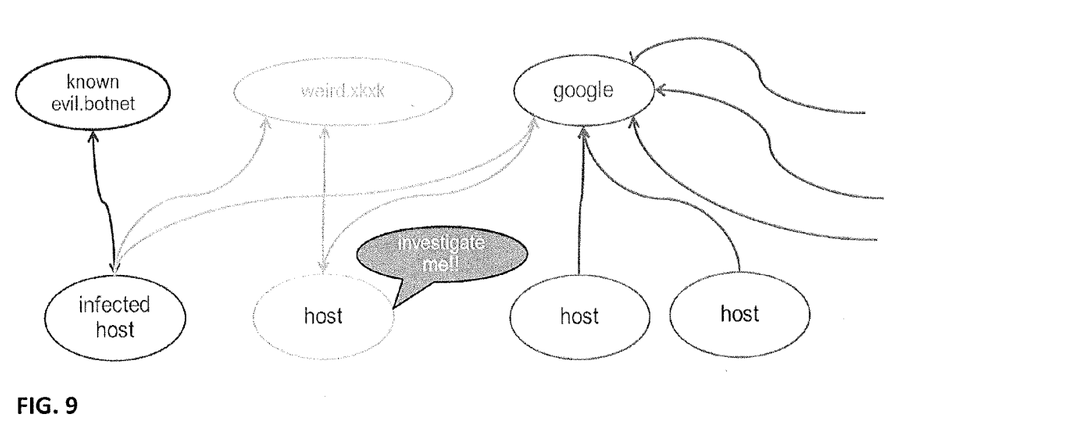
FIG. 9 is an example of belief propagation on an internal computer and domain name graph.

Once a domain/IP is positively identified as malicious it is assigned a large risk value, and host computer's which have connected to it have the riskiness propagate through edges of the graph and are thus risky. An internal computer at high risk which also has communicated with a domain of unknown risk thereby propagates some of its risk factor to all nodes it has connected with. These domains with elevated (but not certain) risk, propagate their risk level to new computers which have communicated with it. Any other computer which communicates with this same domain is thus at elevated risk. Other well connected domains which communicate with a large variety of computers are much less likely to be risky since at a global level that vast majority of computers are not malicious and have not gone to malicious sites. Risk is propagated from known detected malicious domains across the network using the Bayesian belief propagation algorithm to inform and score internal computers by their interconnectedness to risk. The network is "seeded" with some ground truth risk levels (known positive and negative domains) and riskiness propagated until equilibrium is reached. A global consortium view of the data provides elevated performance as compromises detected in one organization, with a set of domains manually confirmed to be malicious, yields information which can be propagated to other organizations to score their internal computers for riskiness if they connected to high risk domains. In this scenario it is necessary to distinguish queries emanating from distinct internal computers being protected, i.e. prior to any internal NAT service in a router which aggregates multiple IP streams into one. This scenario is illustrated in FIG. 9.

Autonomous System Number (ASN) and Country Flux

An Autonomous System Number (ASN) represents one or more ranges of IP address and enables a well-defined routing structure for the Internet as traffic is routed between major network blocks. Within a legitimate organization, public IP addresses typically belong to distinct ranges of addresses which fall under an ASN assigned to larger organizations or institutions that are a significant portion of the Internet (e.g., Internet service providers). An ASN is associated with a distinct region such as a country.

The principles applied to quantifying IP flux can also be applied to the ASNs and the host countries. ASN flux tends to be more significant due to the higher diversity of infected computers compared with the more structured assigned IP addresses within a legitimate organization. As a result, the IP addresses of a botnet tend to belong to many different ASNs and countries while the legitimate organizations IP addresses fall under a single ASN or for very large organizations a few ASNs.

Global Intelligent Profile (GIP) Whitelist

Many domains that are heavily utilized or labeled as false positives via a case manager can be filtered out of the scored domain list. The heavily utilized domains can be automatically identified using a Global Intelligent Profile (GIP) which dynamically keeps track of query frequency for domains across the entire consortium and ages off the domains which are less popular. By filtering out the most commonly used domains, resources can be directed elsewhere and additional false positives avoided. Instead of applying a binary filter to the domain list, the score could incorporate a feature whose value is inversely proportional to the query volume for a domain. For example, $f=-\log(m+x)$ where x is volume and m is median volume of all domain names. This self-learning whitelist table is very important for timely identification and retirement of whitelisted domains/IP addresses and be a big improvement over the static white lists in use today.

TTL Diversity

Some servers are more valuable to the botnet owner than others based on the host's uptime and network status. Servers that are on all the time and with IP addresses that are static or change infrequently are not only more reliable for the botnet's purposes but can also have resource records with longer TTLs. The longer the TTL, the longer the malware's host can cache the resource record thereby reducing the number of times the malware exposes itself to detection via DNS queries. On the other hand, botnet servers with shorter uptimes and dynamic IP addresses require the botnet owner to lower the TTLs to improve the malware's chances of connecting. A high diversity of TTLs would be less common for web service providers or other companies with large cliques since their servers tend to have a more uniform configuration. Thus high TTL diversity is an additional factor when calculating the riskiness of query names.

Beaconing

Beaconing is the malware's DNS querying behavior as it tries to contact a botnet server to set up C&C. Beaconing can simply be a repetition of queries from the malware until a botnet server IP address is obtained and after a successful connection to the server. Another scenario is for the botnet server to have the responding DNS message carry the communication payload. Note that TCP is used by DNS for messages that are greater than 512 bytes in size and messages of the DNS message type 'TXT' can carry machine readable data.

Malware initiates a C&C by first querying for one more domain names that are hard coded or dynamically generated. In the scenarios above, the name servers or hosts associated with the resolved IP addresses may be offline and do not respond. In such a case, the malware may sleep for a period of time and then try to connect again. If the TTLs of the domain names have expired, then additional DNS queries will be made by the malware. The delta time between queries to legitimate domains could match that of the TTL since queries to a name server are not needed until the resource record in the client cache expires. Of course, the query delta time for malware could be designed to match the TTL of the botnet resource records.

Figure 10:
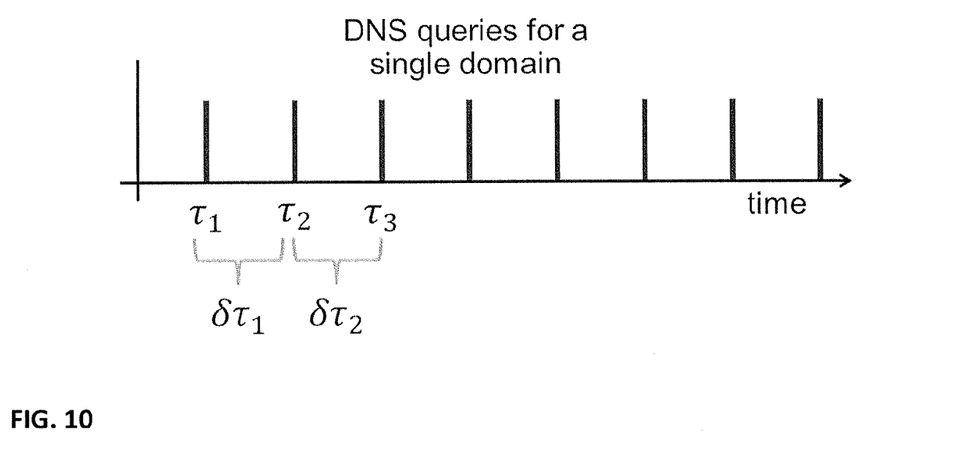
FIG. 10 shows simple beaconing.

The beaconing signal can be detected by its time interval pattern since it is not trivial for software to emulate human behavior. A simple beaconing signal would repeat at a constant interval and is easily detected by the second order moment (e.g., standard deviation) of delta time which goes to zero as the delta time becomes constant. If the malware were to use a uniform random number generator to determine the interval between queries, then an entropy measure, i.e., $H(X)=-\Sigma_{k=0}^{n} p(x_k) \log p(x_k)$ of the interval would obtain its maximum value. Predefined regular intervals (e.g., 60 seconds or patterns such as 30, 60, 120, 30, 60, 120, ...) increase the structure of the delta time probability distribution and produce much lower entropy measures. Also, profiling allows for query intervals for the internal computer to be quantified and compared to any new queries from the internal computer. Additionally, the queried domain's historical profile as well as queries for similar domains across the subnet, network or consortium can provide a benchmark against which the new query can be compared.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of detecting command and control behavior of malware on a client computer, the method comprising:
monitoring one or more domain name system (DNS) messages from one or more client computers to a DNS server to determine a risk that one or more client computers is communicating with a botnet, each of the one or more client computers having an IP address;
generating a real-time entity profiles for at least one of each of the one or more client computers, DNS domain query names, resolved IP addresses of query domain names, client computer-query domain name pairs, pairs of query domain name and corresponding resolved IP address, or query domain name-IP address cliques based on each of the one or more DNS messages;
determining, using the real-time entity profiles, a risk that any of the one or more client computers is infected by malware that utilizes DNS messages for command and control or illegitimate data transmission purposes; and generating, using real-time calibration profiles to determine the risk, one or more scores representing probabilities that one or more client computers is infected by malware associated with the botnet.

2. The method in accordance with claim 1, where one or more entity profiles is self-calibrated.

3. The method in accordance with claim 1, in which the real-time scores are generated using self-calibrated profiling technology applied to scores from the system.

4. The method in accordance with claim 1, further comprising scaling one or more profile values based on peer group distributions of DNS messages from the one or more client computers.

5. The method in accordance with claim 1, further comprising aggregating the monitoring from two or more monitoring systems to generate aggregated entity profiles.

6. The method in accordance with claim 4, further comprising generating aggregated scores based on the aggregated entity profiles.

7. A computer program product comprising a non-transitory machine-readable medium storing instructions that, when executed by at least one programmable processor, cause the at least one programmable processor to perform operations comprising:

monitoring one or more domain name system (DNS) messages from one or more client computers to a name server to determine at least one domain name associated with a botnet, each of the one or more client computers having an IP address;

generating a transaction profile for each of the one or more DNS messages;

determining, using real-time entity profiles of the one or more client computers and the transaction profile for each of the one or more DNS messages, a risk that any of the one or more client computers is under control of malware operating on the client computer to generate the one or more DNS messages; and generating, using real-time calibration profiles applied to the risk, a score representing a probability that any of the one or more client computers is under control of the malware, the real-time calibration profiles scaling the risk based on peer group distributions of DNS messages from the one or more client computers.

8. The computer program product in accordance with claim 7, wherein the instructions further cause the at least one programmable processor to perform operations comprising aggregating the monitoring from two or more monitoring systems to generate an aggregated transaction profile.

9. The computer program product in accordance with claim 7, wherein the instructions further cause the at least one programmable processor to perform operations comprising generating an aggregated score.

10. A system comprising:

at least one programmable processor; and a machine-readable medium storing instructions that, when executed by the at least one processor, cause the at least one programmable processor to perform operations comprising:

monitor one or more domain name system (DNS) messages from one or more client computers to a name server to determine at least one domain name associated with a botnet, each of the one or more client computers having an IP address;

generate a transaction profile for each of the one or more DNS messages;

determine, using real-time entity profiles of the one or more client computers and the transaction profile for each of the one or more DNS messages, a risk that any of the one or more client computers is under control of malware operating on the client computer to generate the one or more DNS messages; and generate, using real-time calibration profiles applied to the risk, a score representing a probability that any of the one or more client computers is under control of the malware, the real-time calibration profiles scaling the risk based on peer group distributions of DNS messages from the one or more client computers.

11. The system in accordance with claim 10, wherein the instructions further cause the at least one programmable processor to aggregate the monitoring from two or more monitoring systems to generate an aggregated transaction profile.

12. The system in accordance with claim 11, wherein the instructions further cause the at least one programmable processor to generate an aggregated score based on the aggregated transaction profiles.

\* \* \* \* \*